United States Patent [19]

Anderl

[11] 4,200,039
[45] Apr. 29, 1980

[54] COFFEE MACHINE

[75] Inventor: Siegfried Anderl, Amstetten, Fed. Rep. of Germany

[73] Assignee: Wurttembergische Metallwarenfabrik, Geislingen, Fed. Rep. of Germany

[21] Appl. No.: 950,425

[22] Filed: Oct. 11, 1978

[30] Foreign Application Priority Data

Oct. 12, 1977 [DE] Fed. Rep. of Germany ........ 2745959

[51] Int. Cl.² ............................................... A23F 1/00
[52] U.S. Cl. ...................................... 99/302 R; 99/281
[58] Field of Search ..................... 99/302 R, 282, 280, 99/281, 279, 316

[56] References Cited

U.S. PATENT DOCUMENTS

| | | | |
|---|---|---|---|
| 2,869,451 | 1/1959 | Brondl | 99/302 R |
| 2,874,630 | 2/1959 | Valente | 99/302 R |
| 3,278,087 | 10/1966 | Stasse | 99/302 R |
| 3,423,209 | 1/1969 | Weber | 99/302 R X |

*Primary Examiner*—Edward J. McCarthy

[57] ABSTRACT

A coffee machine comprising a pressure-tight boiler having a hot water tank and a cold water tank having a volume at least about half the volume of said hot water tank, a heater located in the hot water tank, a filter chamber, a discharge line connected to the filter chamber, an ascending tube running from the bottom of the hot water tank to the inlet end of said discharge line, hot water being forced up through said ascending tube after heating of the water by a buildup of pressure in said boiler, the hot water passing into the discharge line and to the filter chamber, said cold water tank communicating with said hot water tank in an upper region of said boiler and also through a connection near the bottom thereof so that as the hot water is forced out of the hot water tank, cold water will flow into the hot water tank from the cold water tank, the connection controlling the quantity of cold water supplied to thereby controlling the maximum temperature of the hot water and substantially preventing heat from penetrating into said cold water through convection.

10 Claims, 4 Drawing Figures

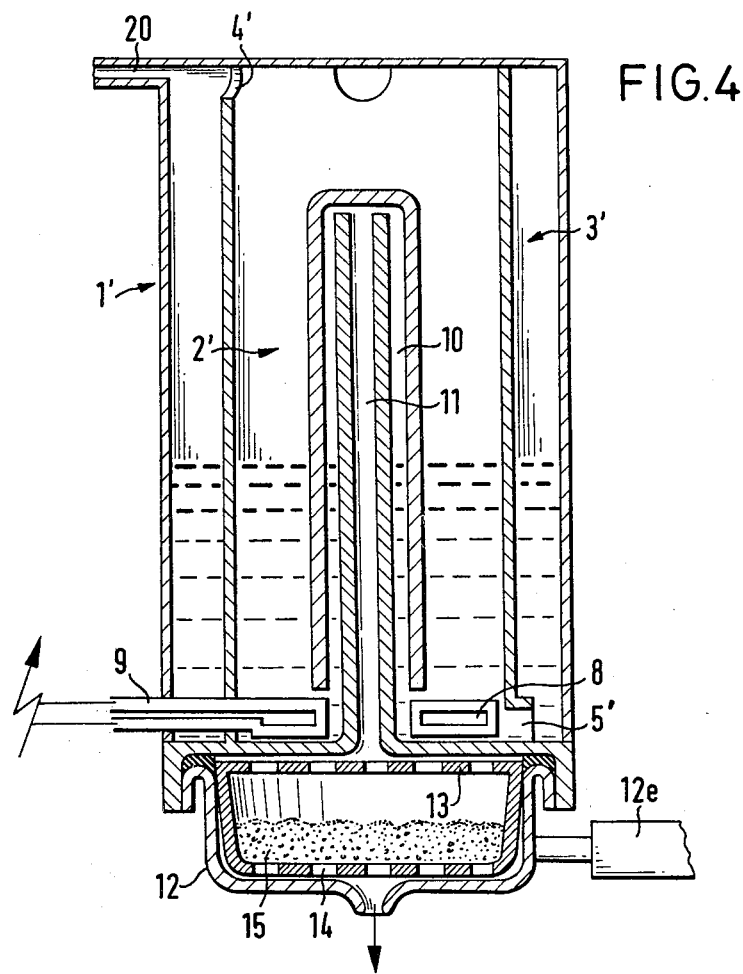

COFFEE MACHINE

The invention relates to a coffee machine having a pressure-tight boiler, a heater disposed therein, a discharge line connected to a filter chamber, and an ascending tube running from the bottom area of the boiler to the boiler-side opening of the discharge line, the hot water being forced to the filter chamber through the ascending tube after buildup of an overpressure in the boiler.

To prepare the beverage in this type of coffee machines, the required quantity of fresh water is filled in the boiler, which is empty in the state of rest, and heated. In the interest of a simple and low-cost machine construction, heating bodies with constant (non-adjustable) output are employed to heat the water. Mainly strong heating elements are utilized to reduce the heating time of the scalding water.

When the boiling point is exceeded, steam is developed which forces hot water through the ascending tube to the filter chamber and across the material to be scalded. The danger exists that the diminishing and continuously heated quantity of water in the boiler reaches temperatures far above 100° C. This phenomenon occurs especially if, in the case of the finest ground material to be scalded, the rate of flow of the scalding water is reduced, Scalding with overheated water sets free in the ground coffee an excessive quantity of bitter substances, in addition to the desired aromatic substances and dyestuffs, which greatly impairs the taste of the ready-to-serve coffee. In order to supply good coffee, it is necessary to ensure a prespecified temperature and pressure variation for the preparation in the machine, whereby the highest temperature which can be attained must not exceed a certain value.

In the prior art, various techniques have been suggested to prevent the water from overheating. In addition to the discharge line entering the filter chamber across the material to be scalded, a known coffee machine of the type mentioned at the start of this application (German Application No. 15 79 502) has a subsidiary line which bypasses the material to be scalded and is connected to the outlet of the filter chamber. An overpressure valve is located in the bypass which, when a given pressure is reached in the boiler, allows first steam to escape and, when the pressure increases further from a specified pressure head, also hot water. Hence, this known coffee machine has a more complex construction and is susceptible to trouble because of the overpressure valve. It further has the disadvantage that only a portion of the boiling water flows across the material to be scalded, while the overheated rest flows directly to the collecting vessel. With an adverse discharge coefficient, particularly if the material to be scalded is excessively ground, the ratio of the coffee brew to the clear water can be so adverse that the resultant beverage becomes too thin. Further, uncontrolled discharge of the steam can materially alter the preset quantity of water. Moreover, steam escaping in fairly large quantities often has a very disturbing effect noticeable as dampness and noises.

The primary object of the present invention is to provide a coffee machine of the type described at the start of this application which, despite its simple construction, allows a pressure and temperature variation during the scalding process which assures a satisfactory quality of the coffee, which causes no change in the preset quantity due to loss of steam, does not disturb the environment by blow-off steam, and heats the water in the shortest time possible.

The above and other objects are achieved by the invention in that the boiler is subdivided into a hot water tank containing the heater and the ascending tube, and a cold water tank containing at least about half the volume of the hot water tank, the cold water tank being in such communicative connection with the hot water tank through a connection in the upper region of the boiler and through a connection in the area near the bottom that as the hot water is being forced out there is an afterflow of cold water in such quantity that the maximum temperature of the hot water does not exceed a given value, e.g. 105° C., whereby the connection near the bottom is essentially without a throttle but is so narrowly constructed that hot water is essentially prevented from penetrating into the cold water tank through convection.

The coffee machine embodying the principles of this invention allows a conveniently early start of the scalding process, since initially only the quantity of water in the hot water tank is to be heated to the boiling point. Only when the water starts being supplied to the filter chamber, that is to say, when the water surface in the hot water tank begins to drop, is there an afterflow of cold water from the cold water tank. This cold water mixes with the heated water in the area near the bottom, that is to say, near the heater, so that the constant heat output for heating said mixture is used up. Thus, overheating of the hot water is effectively prevented, particularly because the quantity of water in the hot water tank is not reduced to the same degree as the brew consumption, but more slowly, dependent upon the particular water surfaces, i.e., cross sections of both water tanks. This also keeps the temperature increase of the water at a lower level with the same heat output. All this ensures a scalding temperature which does not endanger the coffee taste caused by the release of bitter substances. The lower water temperature and the lower maximum steam pressure in the coffee machine according to the invention further offer the advantage that less scale is deposited and that, because of the subdivision into two smaller water tanks, thinner boiler plates are employed and the entire boiler can have a simpler construction. Also, the total time needed for making the coffee is reduced, since there is less heating time until the start of the scalding process due to the smaller quantity of water to be heated initially.

Another important advantage of the coffee machine according to the invention resides in the fact that due to the choice of volume relations between the hot and cold water tanks and to the shape of the cold water tank a specified pressure and temperature variation for the scalding process can be selected and established throughout the scalding period. A cold water tank having a substantially constant cross-sectional area along the height thereof supplies to the hot water tank a quantity of cold water which corresponds to the falling height, i.e., the falling velocity. Hence, in a cold water tank having cross-sectional areas which vary along the height thereof the quantity of afterflow water into the hot water tank varies also. When the water surface in the cold water tank is in the region of large cross-sectional areas there is relatively more (in the region of small cross-sectional areas, relatively less) afterflow of cold water. In a cold water tank having cross-sectional areas which taper from the bottom upwards, the maximum temperatures of the scalding water will develop at the start of the scalding process, since during this time period the water surface in the cold water tank drops in the region of the small cross sections. The temperature of the scalding water decreases towards the end of the scalding process consistent with the stronger after flow of cold water. If a cold water tank is employed whose cross section tapers from the top downwards, the temperature of the scalding water increases only slowly from the start of the scalding process, since initially there is a comparatively large overflow of water from the cold water to the hot water tank. This supply diminishes increasingly so that towards the end of the scalding process there can be a higher water temperature in the hot water tank. Since the taste of the ready-to-serve coffee is largely dependent upon the pressure and temperature variation throughout the scalding process, coffee tastes which vary from region to region can simply be satisfied by selecting a cold water tank which is conditioned by the shape and size.

Other features and advantages of the invention will be better understood from the consideration of the ensuing description offered by way of non-limitative example, and from the attached drawings wherein:

FIG. 4 shows another form of construction.

Figure 1:
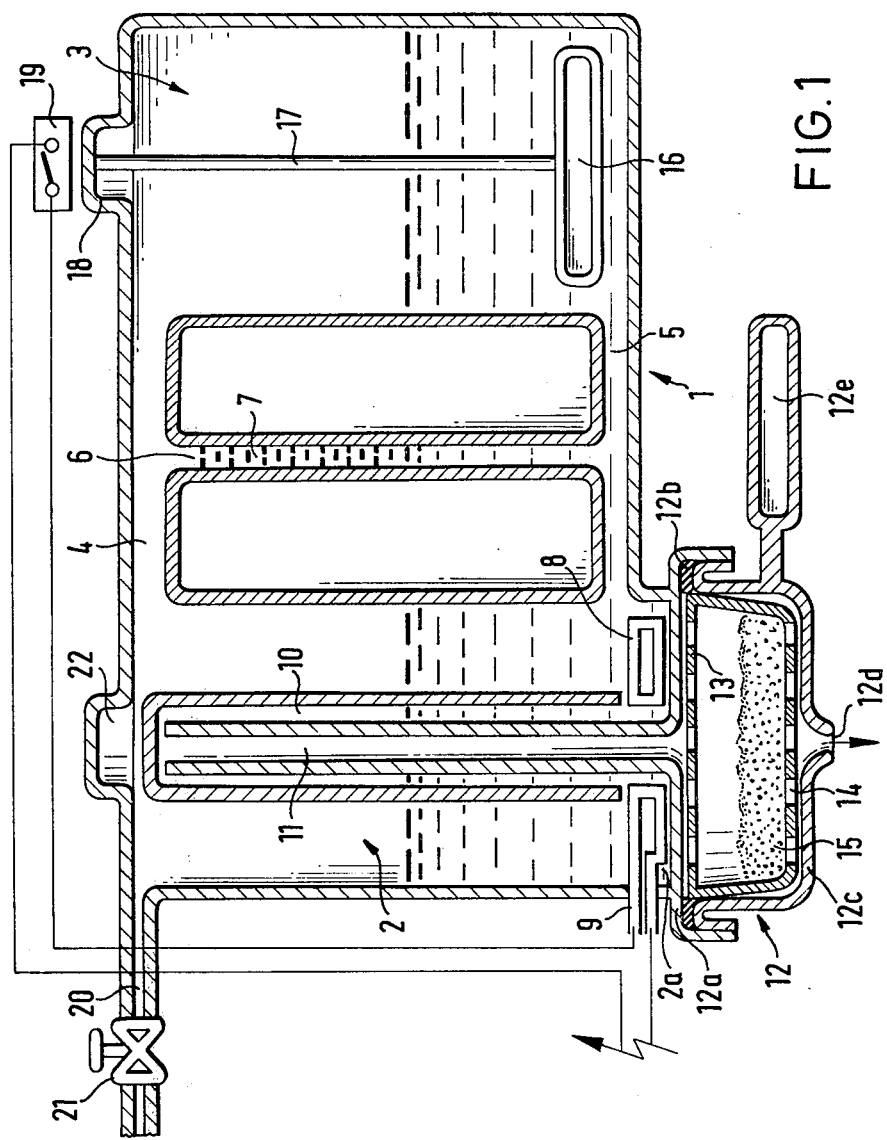
FIG. 1 is a diagrammatic view of a coffee machine embodying the principles of the invention.

The coffee machine shown in FIG. 1 has a pressure-tight boiler housing denoted in its entirety by the numeral 1. It contains a hot water tank 2 and a cold water tank 3. Both tanks are in communication with each other through a connection 4 in the upper boiler region and a connection 5 near the bottom. Also, between both water tanks a water-level indicator 6 is connected at the top and at the bottom with connections 4 and 5 in such a manner that its contents likewise communicate with the contents of both water tanks. It has a scale 7 which is calibrated in cups.

Hot water tank 2 holds in its bottom area 2a, which is depressed in relation to the rest of the bottom of the boiler, a heater 8 shown diagrammatically. The latter is connected to an electrical connection 9 by means of leads which traverse the boiler wall in sealing engagement therewith. The hot water tank further has approximately in its center an ascending tube 10 which is closed at the top and surrounds vertical discharge line 11, which is connected through the bottom of the hot water tank to a filter chamber denoted in its entirety by the numeral 12. Said filter chamber is formed by a cover 12a surrounding the mouth of the discharge line and by a filter holder 12c, which can be pressure-sealed by means of seal 12b. Filter holder 12c contains a water distributor filter 13 in its upper region and a scalding filter 14 in its lower region, the material to be scalded 15 being placed on scalding filter 14. The ready-to-serve coffee brew leaves the filter chamber through outlet 12d. The filter holder has a handle 12e for easier operation during the filling and emptying operations.

Cold water tank 3 includes control means to prevent the boiler from drying out which compromises a float 16 which acts upon a level-control switch 19 via rod 17 and pressure-tight transmission 18. Level-control switch 19 is connected to electrical connection 9 for heater 8. The arrangement ensures the activation and deactivation of the heater at specified liquid levels, that is to say, it also acts as a protection against drying. The boiler is filled by means of a supply line 20 which contains a valve 21.

Using the coffee machine described hereinabove, the coffee is prepared as follows: The material to be scalded 15, measured for the number of cups provided, is placed on scalding filter 14 of the removed filter holder 12c and the filter holder is attached to cover 12a. Fresh water is conveyed to the boiler via supply line 20. The water rises to equal heights in the hot and cold water tanks, as well as in water-level indicator 6. The water supply is stopped when scale 7 indicates the desired number of cups. As soon as the filling starts, float 16 is raised and, via pressure-tight connection 18, it operates switch 19 which activates heater 8. The water in hot water tank 2 is heated up by the heater, while the contents of the cold water tank remain cold. When the boiling temperature is reached, steam is developed above the water surface, which steam forces air from the boiler via a bleeder valve at 22 (not shown). As more steam is developed the latter is closed. The continuous heating causes the water temperature and the steam pressure to rise. As soon as a specified overpressure is reached, hot water is forced upwardly through ascending tube 10 and down discharge line 11 into filter chamber 12 and across the material 15 to be scalded. The coffee brew flows from outlet 12d into a vessel disposed therebelow. The outflow of water causes the water surface in the hot water to drop. Owing to the communicative connection with the cold water tank and with the water-level indicator cold water flows through connection 5 near the bottom to the hot water tank. In the area near the bottom of the hot water tank, that is to say, near heater 8, it mixes with the slightly overheated water there. Thus, the continually produced heat output is essentially consumed by heating up the cold water. Hence, the overall temperature of the water in the hot water tank cannot rise much further, or at least only slightly. Experiments have shown that the temperature, in conformity with the selected magnitude relation between hot and cold water tanks and with their physical shapes, does not exceed a specified temperature of, say, 105° C. Since further cooling occurs through the ducts and fittings, it is ensured that no overheated water flows across the material to be scalded, which might deleteriously affect the quality of the beverage. Since the water surface in the hot water tank drops as much as the water in the cold water tank, deactivation of the heater 8 by the descending float via level-control switch 19 is assured, that is to say, when the lower-lying heater is still surrounded by water, so that it cannot burn through. A dependable operation of the level-control switch is assured by the absence of scale in the cold water tank. Finally, steam escapes through the ascending tube into the filter chamber, drying the scalded material. The filter holder can be removed at the end of the scalding process and the amply dried scalded material can readily be removed. If desired, a new scalding process can follow immediately.

Figure 2:
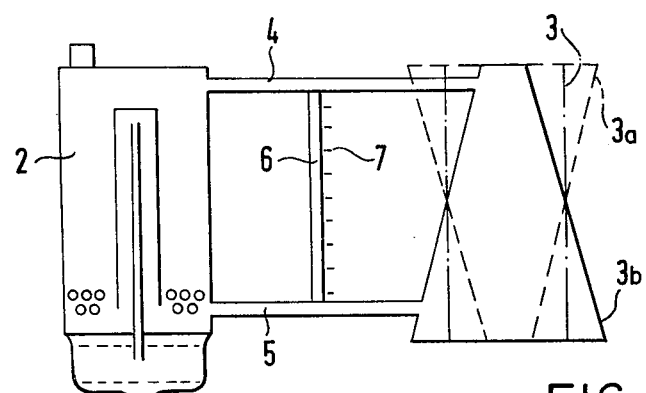
FIG. 2 shows other types of the coffee machine, on a smaller scale.
Figure 3:
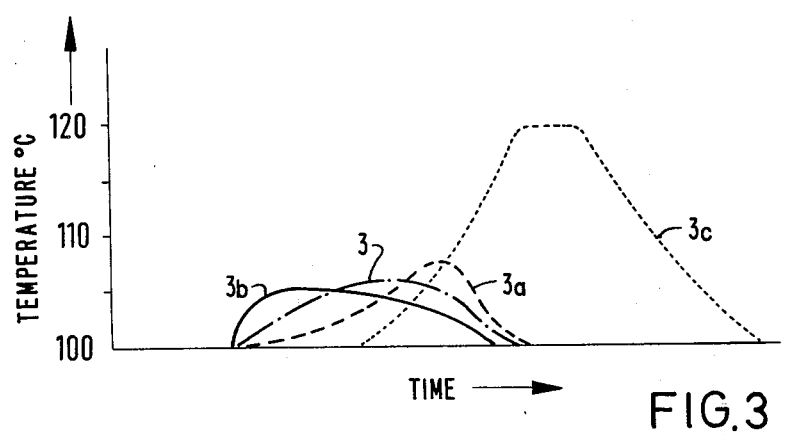
FIG. 3 show temperature/time diagrams for the types of FIG. 2.

FIG. 2 is a diagrammatic view of various types of the coffee machines embodying the principles of the invention, wherein specified pressure or temperature variations during the scalding process can be achieved by changing the shape of the cold water tank. FIG. 2 shows in dash-dotted lines a cold water tank 3 having a cross section which remains constant along the height thereof, approximately as in FIG. 1; in broken lines a cold water tank 3a having a cross section which increases from the bottom upwards; and in solid lines a cold water tank 3b having a cross section which tapers from the bottom upwards. The diagram in FIG. 3 shows the temperature variations in accordance with the particular shapes of the tanks during the scalding period, each in the same profile of the spectral line. The plotting includes the period of time which starts with the scalding, that is to say, during the increase in temperature of the water above 100° C. when the pressure starts building up, and terminates when the temperature drops below 100° C., that is to say, when the water is used up and the pressure is compensated by the outflow of steam. By way of comparison, the temperature curve obtained without the presence of a cold water tank is shown in broken lines.

A coffee machine having a cold water tank 3 with a cross section which remains constant along the height thereof exhibits a substantially sinusoidal temperature curve for the scalding water (dash-dotted line a flow). From the boiling point on, the temperature curve increases substantially in proportion to the time, a large proportion of the heat being consumed initially for building up the steam pressure needed to force out the water. As soon as the scalding water is forced out of the boiler into the ascending tube, there is a flow of cold water consistent with the cross-sectional ratio between the hot and cold water tanks, that is, in the case of substantially identical cross sections, approximately half as much cold water as the total amount of hot water produced. Hence, the major part of the heat is consumed to heat this water up to the temperature of the remaining water, the remainder causing the temperature of the water to increase slowly, reaching approximately 105° C. after more than half the entire scalding period. The temperature does not increase thereabove, since part of the heat is also consumed to generate steam, because there is a larger space for the steam to fill consistent with the reduced volume of the water in the entire boiler. After about two-thirds of the scalding period, the major portion of the scalding water is already used up. The float in the cold water tank deactivates the heater. Sufficient steam pressure is produced to press the remaining water through the ascending tube, and there is sufficient after-heat of the deactivated heater to prevent the temperature of the mixture from dropping too rapidly. The temperature drops slowly, also the scalding water carried off last still has a temperature of about 100° C.

A coffee machine with a cold water tank having a cross section which tapers from the top downwards exhibits a different temperature variation during the scalding period (broken line 3a in FIG. 3). As soon as an adequate steam pressure is built up in the boiler, shortly after the boiling temperature is reached and the hot water starts flowing out, a relatively large volume of the lost water (expressed as a percentage) from the cold water tank is replaced. Thus the constant heat output can increase the overall temperature only slightly, the temperature of the scalding water increases only very slowly during almost half the scalding period. However, the percentage of the cold flow water to the scalding water consumed drops steadily due to the contracting cross section of the cold water tank. Therefore, approximately from half the scalding period on, the temperature of the water increases gradually more strongly and reaches its highest point, which is also about 105° C., practically towards the end of the heating period, but later than in the case of a uniform supply of cold water. Hence, the hottest water of the scalding process flows across the material being scalded at the end of the scalding process.

An approximate mirror image of the scalding process described hereinabove is shown by the temperature variation of the scalding water in the case of a coffee machine with a cold water tank having a cross section which flares from the top downwards (Solid line 3b in FIG. 3). At the start of the scalding process, that is to say, as soon as the hot water starts flowing out through the ascending tube, a very small percentage of cold water flows out in comparison with the amount of water carried off. Thus, the water in the hot water tank is intensely heated at the start of the scalding period. The highest temperature of the scalding water of approximately 105° C. is attained shortly after the start of the scalding process. Initially, very hot water flows across the material being scalded. Thereafter, the temperature of the water decreases slowly but steadily, since the scalding water consumed in increasingly replaced by cold water. Already before the end of the scalding process the temperature of the scalding water from the top is brought very close to the boiling temperature.

The curve of a coffee machine without a cold water container (broken line 3c in FIG. 3), which is plotted for comparison, shows the considerable differences and, thus, the advantages of the coffee machine according to the invention. At first, caused by the fact that the total amount of water in the only tank provided must first be heated to the boiling temperature of 100° C. The temperature of the scalding water increases uniformly and relatively steeply, since the heat output serves in part to increase the steam pressure, essentially however to further heat the decreasing amount of water. The temperature of the water increases to 120° C., this upward limitation being caused by the fact that in the meantime the steam pressure has also reached the necessary height for operating a drain valve. After deactivation of the heater, the decrease in temperature is approximately the same as the increase in temperature. However, it must be borne in mind that a relatively small residual amount of water is carried off which up to the very end is considerably hotter than 100° C. Thus, intensely overheated water flows across the material being scalded during the major part of the scalding period. This has a deleterious effect on the quality of the beverage.

FIG. 4 shows another form of construction of a coffee machine which is distinguished from the one shown in FIG. 1 in that hot water tank 2' is located inside cold water tank 3'. In the following sections we shall only discuss the components which are substantially modified in comparison with the construction according to FIG. 1. In FIG. 4 their reference symbols are provided with an '. Housing 1' is smaller and compacter and essentially forms the wall of cold water tank 3'. Connection 4' in the upper boiler region and connection 5' near the bottom, both of which connect internal hot water tank 2' with cold water tank 3' which surrounds the latter, take essentially the form of a perforation in the wall of hot water tank 2'. The form of construction shown in FIG. 4 is advantageous from a structural point of view because it saves space as well as energy, since the cold water tank consitutes extra insulation of for the hot water tank. A float and a water-level indicator have not been shown in FIG. 4. They can be mounted in the usual manner, the water-level indicator may also be replaced by a window in the cold water tank.

The invention is not restricted to the preferred embodiments described hereinabove. The shpaes and connections between hot and cold water tanks shown diagrammatically may vary within the scope of the invention. In particular, it is possible to shape the connection near the bottom of the cold water tank to the hot water tank in such a way that the flowing cold water is brought so close to the opening of the ascending tube that a portion thereof is forced directly into the ascending tube with the hot water without prior heating, thus cooling directly the water that reaches the material being scalded.

As shown schematically, it is not necessary for the cross-sectional modifications of the cold water tank to be continuous, they may also be discontinuous and/or run in opposite directions throughout the height of the tank, that is to say, the cold water tank may have a central bulge or a central constriction. The same varying cooling effect of the scalding water can also be achieved by modifying the cross sections of the boiler. Further, an adjustable throttle may also be built into the connecting line to delay the afterflow of cold water and, thereby, to lower the permanent operating temperatures.

It is not necessary to mount the filter holder directly below the hot water tank; any location will do, even above the boiler. Within the scope of the invention, it is also possible to use a boiler without an ascending tube, with water flowing out directly by gravity and with a suitably arranged filter chamber. Further, the cold and/or hot water tank may be constructed with at least partial transparency, in which case the separate water-level indicator may be dispensed with.

I claim:

1. A coffee machine comprising a pressure-tight boiler having a hot water tank and a cold water tank having a volume at least about half the volume of said hot water tank, a heater located in the hot water tank, a filter chamber, a discharge line connected to the filter chamber, an ascending tube running from the bottom of the hot water tank to the inlet end of said discharge line, hot water being forced up through said ascending tube after heating of the water by a buildup of pressure in said boiler, the hot water passing into the discharge line and to the filter chamber, said cold water tank communicating with said hot water tank in an upper region of said boiler and also through a connection near the bottom thereof so that as the hot water is forced out of the hot water tank, cold water will flow into the hot water tank from the cold water tank through said connection, the connection controlling the quantity of cold water supplied to thereby controlling the maximum temperature of the hot water and substantially preventing heat from penetrating into said cold water through convection.

2. The coffee machine of claim 1 in which the cold water tank has substantially the same volume as the hot water tank.

3. The coffee machine of claim 1 or 2 in which the cold water tank has substantially the same cross section along its height.

4. The coffee machine of claim 1 or 2 in which the cold water tank has a variable cross section along its height.

5. The coffee machine of claim 4 in which the cold water tank has a cross section which narrows from the bottom upwards.

6. The coffee machine of claim 5 in which the cold water tank has a cross section which increases from the bottom upwards.

7. The coffee machine of claim 1, wherein said connection between the bottoms of the hot and cold water tanks is a narrow passage relative to the volumes of the tanks.

8. The coffee machine of claim 1 in which said cold water tank contains control means connected to the heater to prevent the boiler from drying out.

9. The coffee machine of claim 1 in which said cold water tank has a water-level indicator.

10. The coffee machine of claim 1 in which said hot water tank is located substantially in the center of said cold water tank.

* * * * *